(12) United States Patent
Rotbert et al.

(10) Patent No.: US 12,398,696 B2
(45) Date of Patent: Aug. 26, 2025

(54) METHODS FOR CONTROLLING A WIND FARM

(71) Applicant: General Electric Renovables Espana, S.L., Barcelona (ES)

(72) Inventors: James Gregory Rotbert, North Potomac, MD (US); Patrick Hammel Hart, Ballston Lake, NY (US); Charles Joseph Kosuth, Albany, NY (US); Alina Fatima Moosvi, Ballston Spa, NY (US); Steven Wade Sutherland, Roanoke, VA (US); Vaidhya Nath Venkitanarayanan, Schenectady, NY (US); Leonardo Cesar Kammer, Niskayuna, NY (US); Enno Ubben, Steinfurt (DE); Alev Akbulut, Rheine (DE)

(73) Assignee: GE Vernova Renovables Espana, S.L., Barcelona (ES)

( * ) Notice: Subject to any disclaimer, the term of this patent is extended or adjusted under 35 U.S.C. 154(b) by 385 days.

(21) Appl. No.: 17/910,448

(22) PCT Filed: Mar. 11, 2020

(86) PCT No.: PCT/US2020/022033
§ 371 (c)(1),
(2) Date: Sep. 9, 2022

(87) PCT Pub. No.: WO2021/183120
PCT Pub. Date: Sep. 16, 2021

(65) Prior Publication Data
US 2023/0140661 A1    May 4, 2023

(51) Int. Cl.
*F03D 7/04* (2006.01)
*F03D 7/02* (2006.01)

(52) U.S. Cl.
CPC .......... *F03D 7/048* (2013.01); *F03D 7/0284* (2013.01); *F05B 2270/32* (2013.01);
(Continued)

(58) Field of Classification Search
CPC ...................................... F03D 7/048
See application file for complete search history.

(56) References Cited

U.S. PATENT DOCUMENTS

| 11,286,903 B2 | 3/2022 | Brogan et al. |
| 2009/0160187 A1 | 6/2009 | Scholte-Wassink |

(Continued)

FOREIGN PATENT DOCUMENTS

| EP | 2072813 A2 | 6/2009 |
| EP | 3533996 A1 | 9/2019 |

OTHER PUBLICATIONS

PCT International Search Report & Opinion Corresponding to PCT/US2020/022033 on Nov. 23, 2020.

*Primary Examiner* — Nathan L Laughlin
(74) *Attorney, Agent, or Firm* — Dority & Manning, P.A.

(57) ABSTRACT

A system and method are provided for controlling a wind farm during low wind speeds. Accordingly, the farm controller designates at least one of the plurality of wind turbines of the wind farm as a designated turbine. The designated turbine is operating in a full auxiliary mode when the speed of the wind acting on the wind farm is below a wind speed threshold. The remaining wind turbines are operated in a reduced auxiliary mode. The reduced auxiliary mode includes the disabling of at least one of pitching and yawing of the remaining wind turbines. When a power output for the designated wind turbine exceeds a power threshold, the farm controller directs at least one group of the remaining wind turbines to transition from the reduced auxiliary mode to the full auxiliary mode. During certain (Continued)

grid conditions, the transition between auxiliary modes may be delayed.

18 Claims, 8 Drawing Sheets

(52) U.S. Cl.
CPC ... *F05B 2270/321* (2013.01); *F05B 2270/335* (2013.01); *F05B 2270/337* (2013.01)

(56) References Cited

U.S. PATENT DOCUMENTS

| | | |
|---|---|---|
| 2011/0175355 A1 | 7/2011 | Rosenvard |
| 2013/0166082 A1* | 6/2013 | Ambekar ............. G05B 13/041 700/287 |
| 2015/0076824 A1* | 3/2015 | Kumar .................... H02J 3/381 290/44 |
| 2016/0226258 A1 | 8/2016 | Giertz |
| 2020/0244070 A1* | 7/2020 | Sørensen ................ H02J 3/388 |
| 2020/0400120 A1* | 12/2020 | Brogan .................... H02J 11/00 |
| 2021/0054825 A1* | 2/2021 | Yu ......................... F03D 7/0224 |

* cited by examiner

METHODS FOR CONTROLLING A WIND FARM

RELATED APPLICATIONS

The present application claims priority to PCT Application Serial Number PCT/US2020/022033, filed on Mar. 11, 2020, which is incorporated by reference herein.

FIELD

The present disclosure relates in general to wind farms, and more particularly to systems and methods for controlling wind farms at low wind speeds.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to a power grid.

Capturing the kinetic energy of the wind generally includes pitching of the rotor blades and/or yawing of the nacelle of one or more wind turbines in the wind farm to orient the rotor blades relative to the wind. The pitching and yawing are generally accomplished via pitch and yaw systems employing pitch and yaw motors. Typically, the pitch and yaw motors draw power from the grid. However, the amount power drawn from the grid reduces the net value of the power supplied to the grid by the wind farm. When the wind speed is relatively low, a point may be reached at which the amount of power required from the grid may exceed the amount of power which may be produced by the wind farm. As such, it may be desirable to limit the power draw of the wind farm when the wind speeds are relatively low.

As the wind speeds increase from a relatively low wind speed, it may be desirable to increase the draw of power by the wind farm so as to facilitate power generation by the wind turbines. The increase in the draw of power by the individual wind turbines may result in the wind farm presenting a demand signal to the grid. As such, it may be desirable to synchronize the demand signal from the wind farm with the availability of power within the grid.

Thus, the art is continuously seeking new and improved methods for operating wind farms during low wind speeds and returning the wind farms to a power producing configuration thereafter. Accordingly, the present disclosure is directed to systems and methods for controlling a wind farm during low wind speeds.

BRIEF DESCRIPTION

Aspects and advantages of the invention will be set forth in part in the following description, or may be obvious from the description, or may be learned through practice of the invention.

In one aspect, the present disclosure is directed to a method for controlling a wind farm during low wind speeds. The wind farm may have a plurality of wind turbines operably coupled to a farm controller and a power grid. The method may include monitoring a wind profile of wind affecting the wind farm. The profile may include wind speed and wind direction. The method may include designating, with the farm controller, at least one of the plurality of wind turbines as a designated wind turbine. The designated wind turbine may be operated in a full auxiliary mode when the wind speed of the wind farm is below a wind speed threshold. The full auxiliary mode may include at least, enabling pitching and yawing of the designated wind turbine. The method may also include operating remaining wind turbines of the plurality of wind turbines in a reduced auxiliary mode when the wind speed of the wind farm is below the wind speed threshold. The reduced auxiliary mode may include disabling at least one of pitching, yawing, or other system load of the remaining wind turbines. When a power output for the designated wind turbine exceeds a power threshold, the method may include directing, with the farm controller, at least one group of the remaining wind turbines to transition from the reduced auxiliary mode to the full auxiliary mode.

In an embodiment, prior to directing the at least one group of the remaining wind turbines to transition from the reduced auxiliary mode, the method may include, utilizing, with the farm controller, a grid demand signal received from the power grid so as to determine a power availability level within the power grid.

In a further embodiment, transitioning the at least one group from the reduced auxiliary mode may also include delaying the transition until the power availability level within the power grid exceeds a threshold.

In an additional embodiment, the method may include accelerating the transition of the at least one group from the reduced auxiliary mode in order to supply power to the power grid in response to a detected shortfall of power availability in the grid.

In an embodiment, the method may include analyzing, with the farm controller, a grid demand signal received from the power grid so as to determine a power availability level within the power grid. Based on the determined power availability level, the method may include lowering, with the farm controller, the wind speed threshold so as to delay a transition of the remaining wind turbines of the plurality of wind turbines to a reduced auxiliary mode. Delaying the transition to the reduced auxiliary mode may facilitate wind farm power production at reduced wind speeds in order to satisfy the demand signal from the power grid.

In an embodiment, designating at least one of the plurality of wind turbines as the designated wind turbine may include selecting, with the farm controller, at least one of the plurality of wind turbines based on a power production profile for each of the plurality of wind turbines for the monitored wind profile.

In a further embodiment, the method may include forecasting, with the farm controller, a performance profile for the designated wind turbine for the wind affecting the wind farm, wherein the forecast is based on the power production profile. The method may also include correlating, with the farm controller, the forecast performance profile to a recorded performance profile of the designated wind turbine. Additionally, the method may include refining, with the farm controller, the power production profile for the designated wind turbine based on the correlation.

In an embodiment, the wind profile may also include a pressure gradient. Additionally, determining the designated wind turbine may also include, based on the pressure gradient, forecasting, with the farm controller, a wind speed below the wind speed threshold for a limited duration. The method may also include increasing the number of designated wind turbines based on the forecasted duration of the wind speed below the wind speed threshold.

In an additional embodiment, transitioning the at least one group of the remaining wind turbines to the full auxiliary mode may also include selecting, with the farm controller, the wind turbines of the at least one group of the remaining wind turbines based on a power production profile for each of the plurality wind turbines for the monitored wind profile.

In an embodiment, the method may include initiating a safety override to transition at least one of the remaining wind turbines from the reduced auxiliary mode.

In a further embodiment, operating the remaining wind turbines and reduced auxiliary mode include temporarily decoupling the remaining turbines from the power grid.

In yet a further embodiment, the reduced auxiliary mode may also include disabling at least one of a fan, a pump, an internal lighting source, a deicing system, a heater, and power electronics.

In another aspect, the present disclosure is directed to a method for controlling a wind farm so as to modify a draw profile presented to a power grid. The wind farm may have a plurality of wind turbines operably coupled to a farm controller and a power grid. The method may include operating a designated wind turbine of the plurality of wind turbines in a full auxiliary mode. The method may also include operating remaining wind turbines of the plurality of wind turbines in a reduced mode until a power output for the designated wind turbine exceeds a power threshold. The reduced auxiliary mode may include disabling at least one of pitching and yawing of the remaining wind turbines. Additionally, the method may include receiving, with the farm controller, a grid signal from the power grid indicative of a power availability within the power grid at a monitored wind speed. The method may include determining, with the farm controller a power draw incident to transitioning each turbine of the remaining wind turbines from the reduced auxiliary mode to the full auxiliary mode. The method may also include determining, with the farm controller, a draw profile for the wind farm corresponding to transitioning the wind farm to a power production state. Transitioning the wind farm to the power production state may be based at least in part on the power draw incident to transitioning each turbine of the remaining wind turbines. Recall the method may include determining, with the farm controller, a transition sequence for the remaining wind turbines so as to modify the draw profile for the wind farm during the transition. The method may also include transitioning the remaining wind turbines to the full auxiliary mode in accordance with the transition sequence.

In an embodiment, determining the transition sequence for the remaining wind turbines may include partitioning, with the farm controller, the remaining wind turbines into a plurality of wind turbine groups. The quantity of the groups may be selected to extend a period of transition of the wind farm from the reduced auxiliary mode to the full auxiliary mode. Additionally, the method may include sequencing, with the farm controller, the plurality of wind turbine groups in serial arrangement.

In a further embodiment, the method may include defining, with the farm controller, at least one delay interval. Additionally, the method may include inserting, with the farm controller, the delay interval(s) between at least two of the plurality of wind turbine groups in serial arrangement.

In yet a further embodiment, determining the transition sequence for the remaining wind turbines may include partitioning, with the farm controller, the remaining turbines into a plurality of wind turbine groups based on the determined power draw incident to transitioning from the reduced auxiliary mode to the full auxiliary mode for each wind turbine. The grouping of the wind turbines based on the determined power draw may reduce a peak power draw of the draw profile.

In an additional embodiment, determining the transition sequence for the remaining wind turbines may include deriving, with the farm controller, a power production potential for the wind farm at the monitored wind speed based at least in part on the power output of the designated wind turbine. The method may further include determining, with the farm controller, a ratio of the power production potential to the draw profile. Additionally, the method may include synchronizing, with the farm controller, the transition sequence of the remaining wind turbines with the power availability within the power grid based on the ratio.

In an embodiment, after the power output of the designated wind turbine(s) exceeds the power threshold, the method may include delaying the transition of the remaining wind turbines to the full auxiliary mode until a later time of day.

In an embodiment, the grid signal may indicate a high level of power availability within the power grid, and the method may include increasing the power threshold so as to delay the transition of the remaining wind turbines.

In yet a further embodiment, determining the transition sequence for the remaining wind turbines may include monitoring a wind profile of a wind affecting the wind farm. The profile may include the wind speed and a wind direction. The method may include selecting, with the farm controller, at least one group of the remaining wind turbines based on the power production profile for each of the remaining wind turbines for the monitored wind profile.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
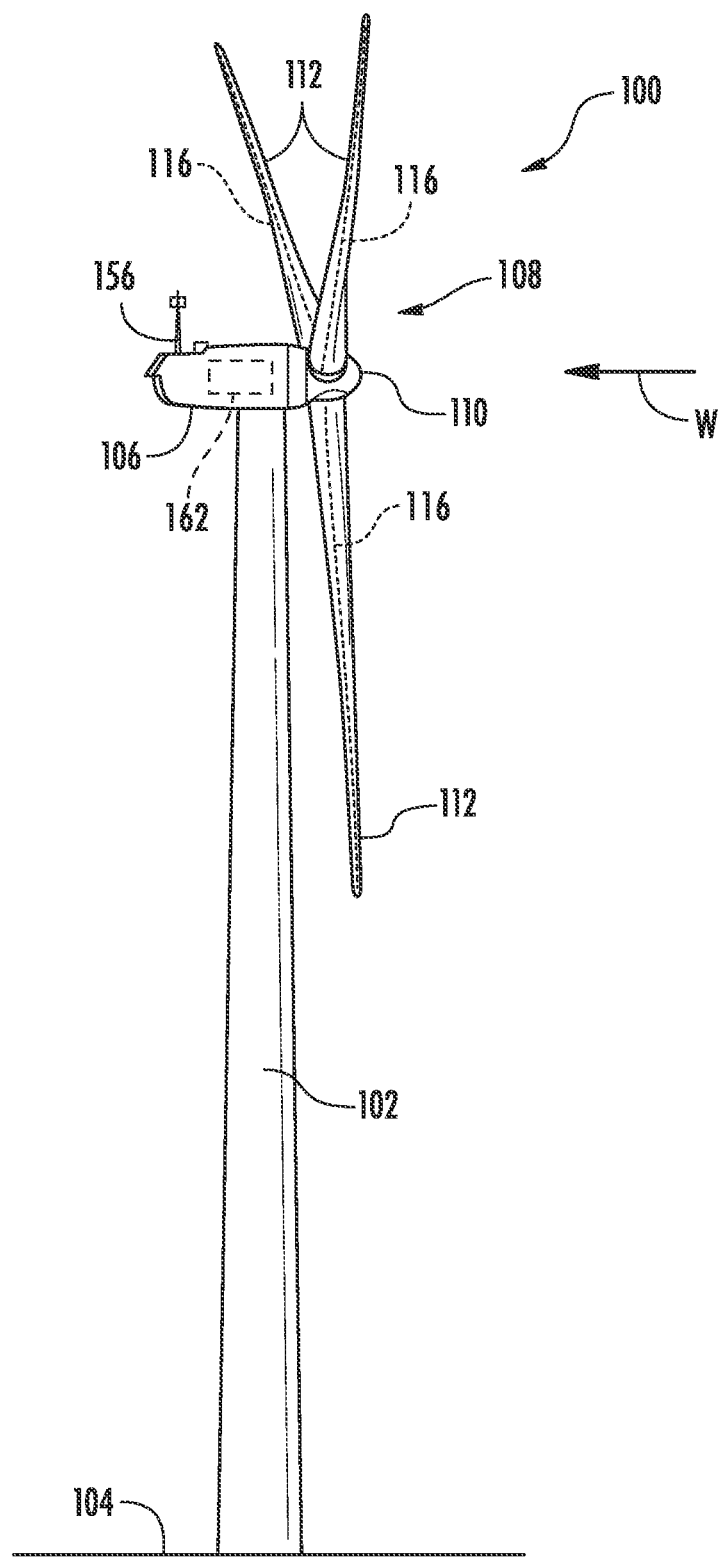
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind farm connected to a power grid. In particular, the present disclosure may include systems and methods which facilitate wind farm operations during low wind speeds. Specifically, the present disclosure may include monitoring a wind profile to detect the approach of the wind speed to a predetermined threshold. When an approach to the predetermined wind speed threshold is detected, the farm controller may implement a control scheme to minimize the power draw of the wind farm while maintaining a readiness to return to a power producing state.

In order to maintain a readiness to return to a power producing state, the farm controller may designate at least one of the plurality of wind farm turbines as a designated wind turbine that is operated in a full, or normal, auxiliary mode as the wind speed drops below a wind speed threshold. In other words, the designated wind turbine(s) may be maintained in a fully operational configuration, being able to pitch and yaw as necessary in an attempt to catch the wind and generate power.

In order to reduce the power draw of the wind farm, the remaining wind turbines of the wind farm may be operated in a reduced auxiliary mode when the wind speed is below the wind speed threshold. The reduced auxiliary mode may include disabling at least one of pitching, yawing, and other system load of the remaining wind turbines. In the reduced auxiliary mode, the power draw of the remaining wind turbines will be reduced since the wind turbines may not be pitching and/or yawing in an attempt to capture the wind when the wind speed is too low. In other words, the remaining wind turbines may not be consuming significant amounts of power at wind speeds which do not support sufficient power generation. The sufficiency of the power generation may be determined based on the magnitude of power generation or the profitability of the power generation.

In accordance with the present disclosure, the system may maintain the remaining wind turbines in the reduced auxiliary mode until the power output of the designated wind turbine(s) exceeds a power threshold. In other words, the designated wind turbine(s) may serve as a scout turbine(s) for the wind farm. As a scout, the designated wind turbine(s) may indicate when the wind speed is sufficient to support power production by the remaining turbines, thereby indicating that conditions exist which justify the draw of power by the remaining turbines.

Once the power output of the designated wind turbine(s) exceeds the power threshold, the farm controller may initiate the transition of at least a portion of the remaining wind turbines from the reduced auxiliary mode. Because the remaining turbines may pitch and/or yaw in order to catch the wind and resume generating power, the wind farm may present a relatively significant demand signal to the power grid. It should be appreciated that it may be desirable to shape the demand signal through the transition sequence/timing of the remaining wind turbines in order to synchronize the demand signal with the power availability of the power grid.

The present disclosure may also include one of the remaining wind turbines producing power. While producing power, the wind turbine may be a net producer. As the wind speed decreases, the wind turbine may transition from a net producer to a net consumer as the power production of the wind turbine falls below the power consumption of the wind turbine. In response thereto, the wind turbine may transition to the reduced auxiliary mode. The reduced auxiliary mode may be equated to a temporary, quasi-parked state using as little yaw and pitch as possible. The quasi-parked state may be sustainable for a limited period of time but may not be ideal if maintained over an extended duration. Once the wind speed increases, or grid conditions change, the wind turbine may transition to the normal (full) auxiliary mode.

From the full auxiliary mode, the wind turbine may, as conditions dictate, either draw such power as may be required to fully park the wind turbine or may return to a power production state.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) positioned within the nacelle 106 to permit electrical energy to be produced.

The wind turbine 100 may also include a controller 200 (FIG. 5) configured as a turbine controller 162 (FIG. 2) centralized within the nacelle 106. However, in other embodiments, the turbine controller 162 may be located within any other component of the wind turbine 100 or at a location outside the wind turbine. Further, the turbine controller 162 may be communicatively coupled to any number of the components of the wind turbine 100 in order to control the components. As such, the turbine controller 162 may include a computer or other suitable processing unit. Thus, in several embodiments, the turbine controller 162 may include suitable computer-readable instructions that, when implemented, configure the turbine controller 162 to perform various different functions, such as receiving, transmitting and/or executing wind turbine control signals.

Figure 2:
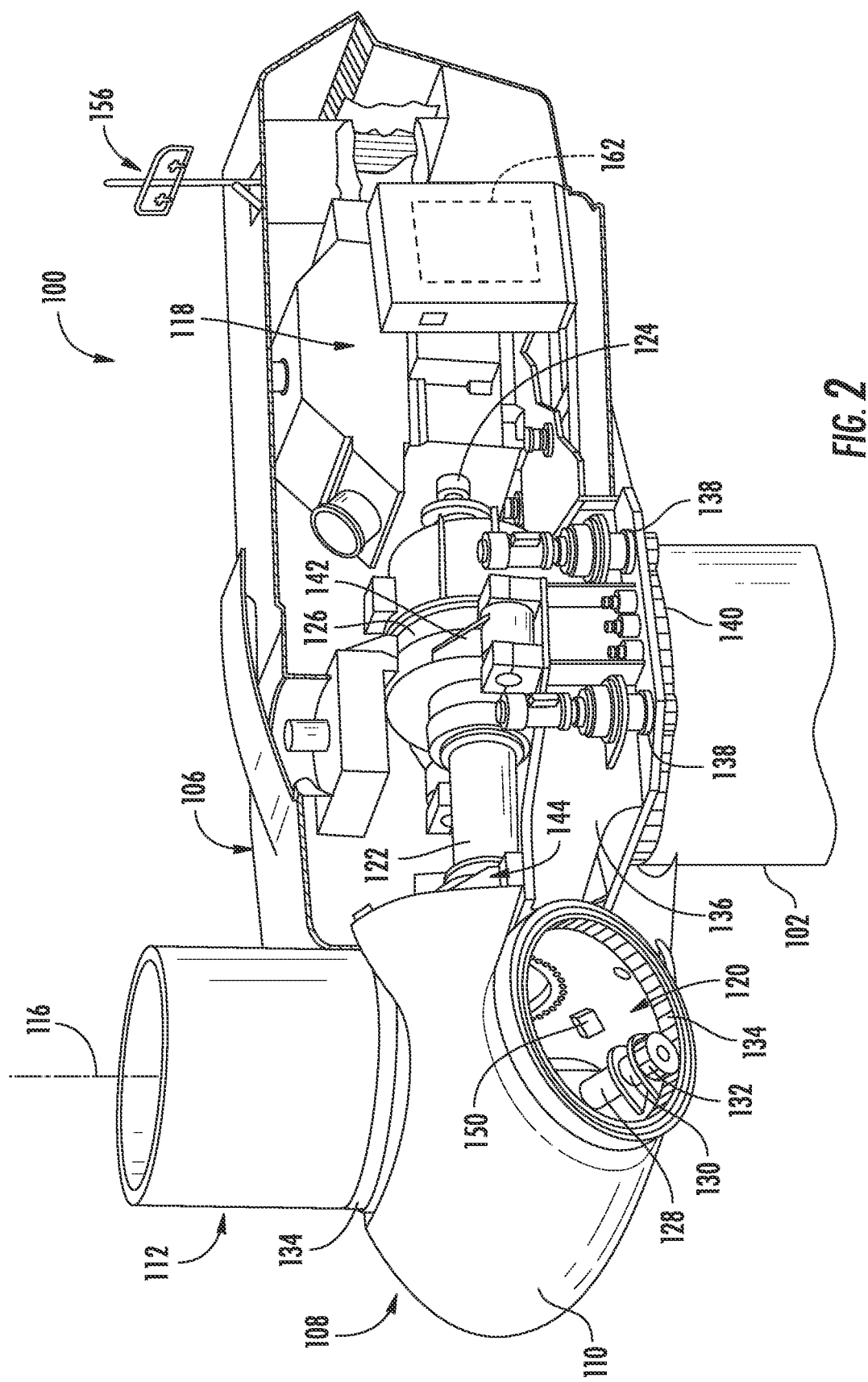
FIG. 2 illustrates a perspective, internal view of one embodiment of a nacelle of a wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through a gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured to convert the low-speed, high-torque input to a high-speed, low-torque output to drive the high-speed shaft 124 and, thus, the generator 118.

Figure 3:
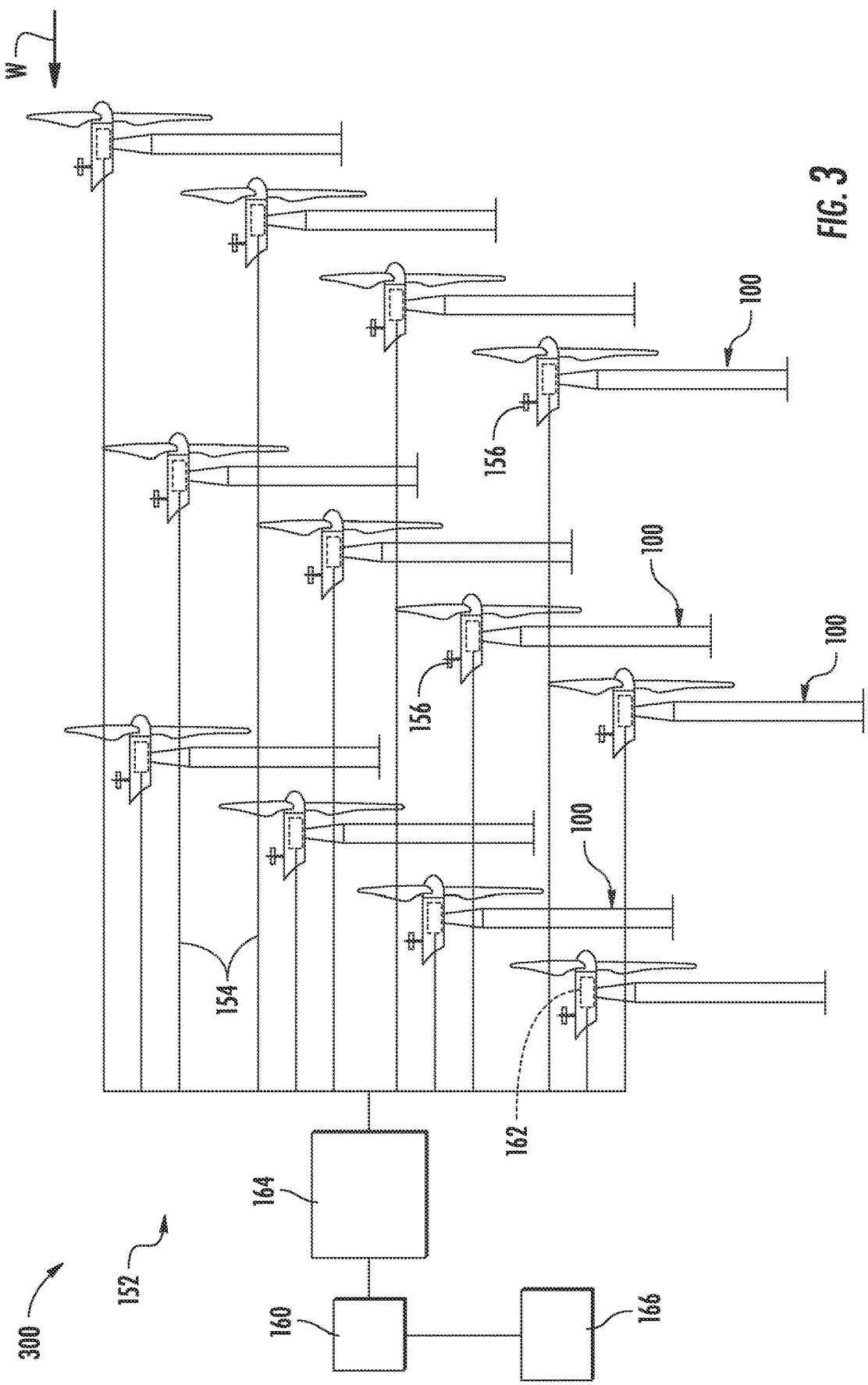
FIG. 3 illustrates a schematic diagram of one embodiment of a wind farm having a plurality of wind turbines according to the present disclosure.

Each rotor blade 112 may also include a pitch control mechanism 120 configured to rotate each rotor blade 112 about its pitch axis 116. The pitch control mechanism 120 may include a pitch controller 150 configured to receive at least one pitch setpoint command from the turbine controller 162. Further, each pitch control mechanism 120 may include a pitch drive motor 128, a pitch drive gearbox 130, and a pitch drive pinion 132. The pitch drive motor 128 may draw power from a power grid 166 (FIG. 3). In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the turbine controller 162, with each yaw drive mechanism(s) 138 being configured to change the angle of the nacelle 106 relative to the wind (e.g., by engaging a yaw bearing 140 of the wind turbine 100). It should be appreciated that the turbine controller 162 may direct the yawing of the nacelle 106 and/or the pitching of the rotor blades 112 so as to aerodynamically orient the wind turbine 100 relative to a wind(W) acting on the wind turbine 100, thereby facilitating power production.

Referring now to FIG. 3, a schematic view of a wind farm 152 controlled according to the system and method of the present disclosure is illustrated. As shown, the wind from 152 may include a plurality of the wind turbines 100 described herein and the controller 200 configured as a farm controller 164. For example, as shown in the illustrated embodiment, the wind farm 152 may include twelve wind turbines 100. However, in other embodiments, the wind farm 152 may include any other number of wind turbines 100, such as less than twelve wind turbines 100 or greater than twelve wind turbines 100. In one embodiment, the turbine controller(s) 162 of the turbine(s) 100 may be communicatively coupled to the farm controller 164 through a wired connection, such as by connecting the turbine controller(s) 162 through suitable communicative links 154 (e.g., a suitable cable). Alternatively, the turbine controller(s) 162 may be communicatively coupled to the farm controller 164 through a wireless connection, such as by using any suitable wireless communications protocol known in the art.

In several embodiments, the wind farm 152 may include a plurality of environmental sensors 156 for monitoring a wind profile of the wind (W) affecting the wind farm 152. The environmental sensor 156 may be configured for gathering data indicative of at least one environmental condition. The environmental sensor 156 may be operably coupled to the farm controller 164 and to the turbine controller 162. Thus, in an embodiment, the environmental sensor(s) 156 may, for example, be a wind vane, an anemometer, a lidar sensor, thermometer, barometer, or other suitable sensor. The data gathered by the environmental sensor(s) 156 may include measures of wind speed, wind direction, wind shear, wind gust, wind veer, atmospheric pressure, pressure gradient and/or temperature. In at least one embodiment, the environmental sensor(s) 156 may be mounted to the nacelle 106 at a location downwind of the rotor 108. It should be appreciated that the environmental sensor(s) 156 may include a network of sensors and may be positioned away from the turbine(s) 100. It should be appreciated that environmental conditions may vary significantly across a wind farm 152. Thus, the environmental sensor(s) 156 may allow for the local environmental conditions, such as local wind speed, at each wind turbine 100 to be monitored individually by the respective turbine controllers 162 and collectively by the farm controller 164.

Figure 6:
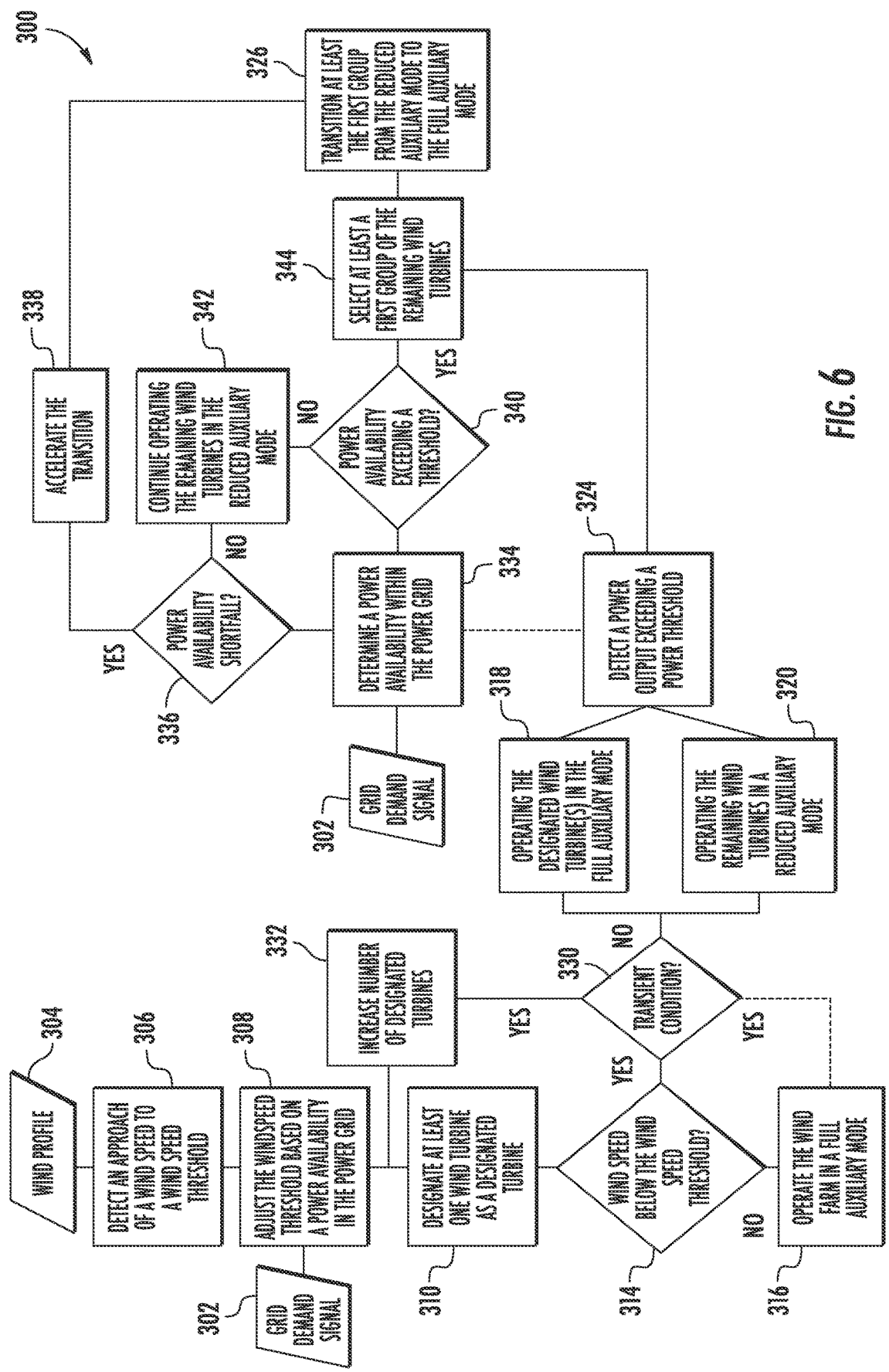
FIG. 6 illustrates a schematic diagram of one embodiment of a control logic of a system for operating a wind farm according to the present disclosure.

Referring still to FIG. 3, in an embodiment, the farm controller 164 may also be operably coupled to at least one grid sensor 160. The grid sensor(s) 160 may be operably coupled to an electrical power grid 166. The grid sensor(s) 160 may be configured to detect data indicative of a power availability within the power grid 166. The power availability may be interpreted by the farm controller 164 as a grid demand signal 302 (FIG. 6).

It should be appreciated that the power availability may correlate to fluctuations within the delivery of power to the power grid 166 and the draw of power from the power grid 166. Accordingly, the value of the power provided to, or drawn from, the power grid may vary with the power availability. For example, a grid operator may offer a higher utility rate for power provided during periods of relatively low availability while also charging a higher utility rate for power drawn from the power grid during the same period. As such, it may be desirable to synchronize the operation of the wind farm 152 to the power availability as indicated by the grid demand signal 302.

Figure 4:
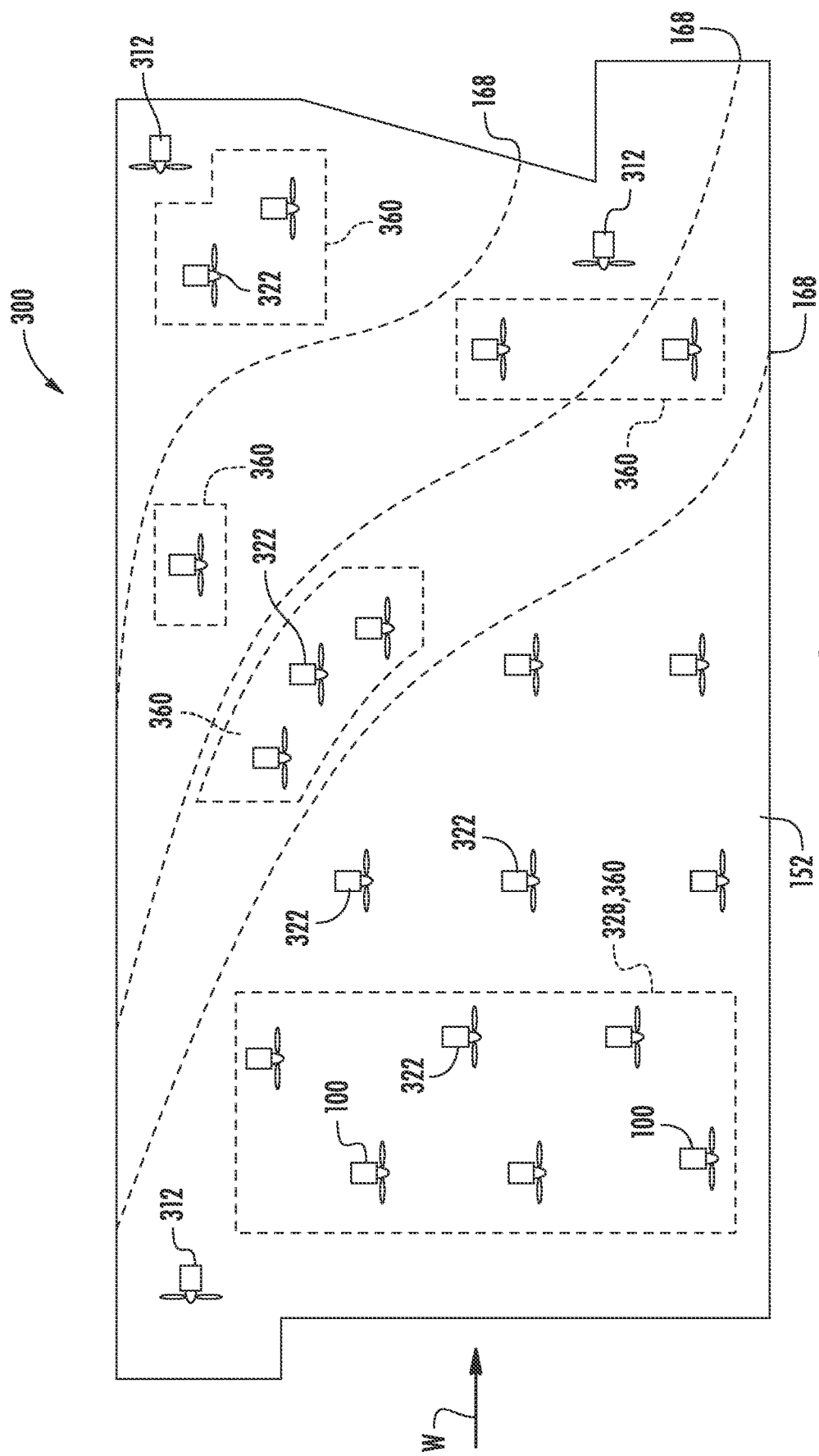
FIG. 4 illustrates an overhead view of one embodiment of a wind farm having a plurality of wind turbines according to the present disclosure.

Referring now to FIG. 4, an overhead view of one embodiment of the wind farm 152 is illustrated. In an embodiment, as shown, the plurality of wind turbines 100 of the wind farm 152 may be located in accordance with the topography of the wind farm 152. For example, the wind farm 152 may have at least one portion being at a higher elevation than an adjacent portion, as illustrated by the topographical lines 168. It should be appreciated that the distribution of the wind turbines 100 of the wind farm 152 and the topography of the wind farm 152 may result in the wind (W) affecting the wind turbines 100 in an unequal manner.

Figure 5:
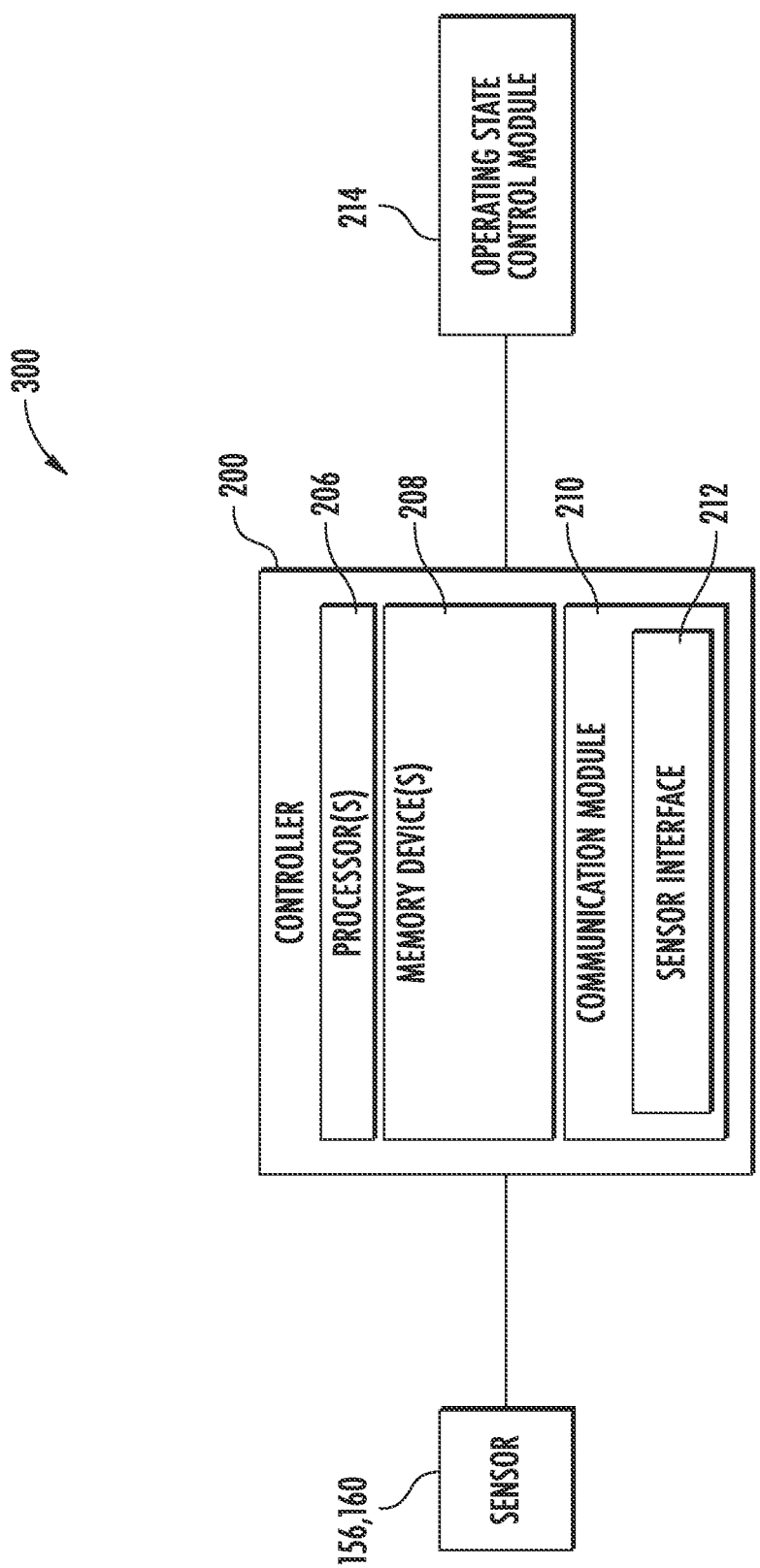
FIG. 5 illustrates a schematic diagram of one embodiment of a controller for use with the wind farm as shown in FIG. 3.

Referring now to FIGS. 5-8b, schematic diagrams of multiple embodiments of a system 300 for controlling the wind farm 152 according to the present disclosure are presented. As shown particularly in FIG. 5, a schematic diagram of one embodiment of suitable components that may be included within the controller 200 is illustrated. For example, as shown, the controller 200 may include one or more processor(s) 206 and associated memory device(s) 208 configured to perform a variety of computer-implemented functions (e.g., performing the methods, steps, calculations and the like and storing relevant data as disclosed herein). Additionally, the controller 200 may also include a communications module 210 to facilitate communications between the controller 200 and the wind turbines 100, and components thereof. Further, the communications module 210 may include a sensor interface 212 (e.g., one or more analog-to-digital converters) to permit signals transmitted from one or more sensors 156, 160 to be converted into signals that can be understood and processed by the processors 206. It should be appreciated that the sensors 156, 160 may be communicatively coupled to the communications module 210 using any suitable means. For example, as shown in FIG. 5, the sensors 156, 160 may be coupled to the sensor interface 212 via a wired connection. However, in other embodiments, the sensors 156, 160 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 202 to perform various functions including, but not limited to, controlling the wind farm 152 during low wind speeds and modifying a draw profile presented to the power grid 166 during a transition of the wind farm 152 from a reduced auxiliary mode as described herein, as well as various other suitable computer-implemented functions.

Referring particularly to FIG. 6, in an embodiment, the farm controller 164 of the system 300 may be configured to monitor a wind profile 304 of the wind (W) affecting the wind farm 152. The wind profile 304 may include wind speed, wind direction, a pressure gradient, and/or a variability indicator. Data indicative of the wind profile 304 may be received from the environmental sensor(s) 156.

As depicted at 306, in an embodiment, the farm controller 164 may detect an approach of the wind speed to a wind speed threshold. The wind speed threshold may be a predetermined wind speed whereat it may no longer be desirable to modify the operating states of the wind turbines 100 in an attempt to generate power. As such, it should be appreciated that the wind speed threshold may, in an embodiment be expressed as a power threshold. At the threshold, the value of the power produced by the wind farm may be essentially equal to the cost of production. The cost of production may include at least one of the utility rate charged by the grid operator for the power drawn from the power grid 166 and a variable accounting for a reduction in the remaining useful life of the components of the wind turbines 100. As the wind speed drops below the wind speed threshold, the cost of production may exceed the value of the power being produced by the wind farm 152. For example, the amount charged by the grid operator for the power consumed in driving the auxiliary systems of the wind turbines 100 may exceed the value of the power which may be produced at the relatively low wind speed.

In at least one embodiment, the farm controller 164 may receive a grid demand signal 302 which indicates that it may be desirable to continue generating power at lower wind speeds than would otherwise be desirable. As such, the farm controller 164 may analyze the grid demand signal 302 to determine the power availability level within the power grid 166. Based on the determined power availability level, the farm controller 164 may, at 308, lower the wind speed threshold to delay a transition of at least a portion of the wind turbines 100 to a reduced auxiliary mode in order to satisfy the demand signal 302. For example, in an embodiment, the grid demand signal 302 may indicate a relatively low availability of power within the power grid 166. In such an embodiment, the value of the power supplied to the power grid may be such that even the reduced power production of the wind farm 152 at the lower wind speeds may outweigh the costs associated with drawing power from the power grid 166. In an additional embodiment, the relatively low availability of power within the grid may indicate that the cost of the power drawn from the grid during the transition may exceed the costs associated with continuing to operate the wind farm 152 in the full auxiliary mode. It should be appreciated that the wind turbines 100 may be in a full auxiliary mode when in a normal, power producing state, or when the wind turbine(s) 100 is a net consumer of power. For example, in an embodiment, the reduced auxiliary mode may be a quasi-parked state using as little yaw and pitch as possible. In such an embodiment, the portion of the wind turbines 100 may temporarily transition to the full auxiliary mode so as to facilitate fully parking the wind turbines 100.

As depicted at 310, in an embodiment, the farm controller 164 may designate at least one of the plurality of wind turbines 100 as a designated wind turbine 312. The designated wind turbine(s) 312 may be operated in a full auxiliary mode regardless of the wind speed. In particular, the designated wind turbine(s) 312 may be operated in the full auxiliary mode when the wind speed of the wind (W) affecting the wind farm 152 is below the wind speed threshold. The full auxiliary mode may include at least enabling pitching and yawing of the designated wind turbine(s) 312. It should be appreciated that the full auxiliary mode may be the nominal operating mode of the wind turbines 100.

In at least one embodiment, the farm controller 164 may select at least one of the plurality of wind turbines 100 based on a power production profile for each of the plurality of wind turbines 100 for the monitored wind profile 304. For example, in an embodiment, the designated wind turbine(s) 312 may be the wind turbine(s) 100 having a demonstrated affinity for power generation under the prevailing conditions. Alternatively, the designated wind turbine(s) 312 may have an average power generation capability relative to the plurality of wind turbines 100. It should be appreciated that selecting a designated wind turbine(s) 312 having an average, or below average power generation capability for the prevailing conditions, may ensure that a power generation level from the designated wind turbine(s) 312 is foreseeably achievable by other wind turbines 100 of the wind farm 152.

In an additional embodiment, the designated wind turbine(s) 312 may be a wind turbine 100 positioned in a particularly advantageous or disadvantaged location relative to the wind (W) affecting the wind farm 152. For example, the designated wind turbine(s) 312 may be wind turbine(s) 100 located at the point of greatest elevation of the wind farm 152 and/or along a portion of the perimeter of the wind farm 152 upwind of other wind turbines 100. Alternatively, the designated wind turbine(s) 312 may be in a disadvantaged position, such as in a wind shadow, or other region of disturbed wind flow. Selecting wind turbines 100 which are in a disadvantaged position may result in the designated wind turbine(s) 312 having a power generation capability which is foreseeably achievable by other wind turbines 100 in more advantageous positions.

In a further embodiment, the designated wind turbine(s) 312 may be a plurality of designated wind turbines, such as depicted in FIG. 4. The plurality of designated wind turbines 312 may be selected for any of the reasons stated previously relating to the power production capability and positioning within the wind farm 152.

In at least one embodiment, the system 300 may include a feedback mechanism configured to refine the selection of the performance profile for the designated wind turbine(s) 312. As such, the farm controller 164 may forecast a performance profile for the designated wind turbine(s) 312 for the wind (W) affecting the wind farm 152. The forecast may be based on a historical power production profile of the designated wind turbine(s) 312. The farm controller 164 may correlate the forecast performance profile to a performance profile recorded while functioning as a designated wind turbine(s) 312. Based on the correlation, the farm controller 164 may refine the power production profile for the designated wind turbine(s) 312.

In an embodiment, the farm controller 164 may, at 314, determine whether the wind speed is below the wind speed threshold. As shown at 316, in an embodiment wherein the wind speed is above the wind speed threshold, the plurality of wind turbines 100 of the wind farm 152 may be operated in the full auxiliary mode.

As depicted at 330, in an embodiment, the farm controller 164 may forecast, based on a pressure gradient of the wind profile 304, a wind speed below the wind speed threshold for a limited duration. In such an embodiment, the farm controller 164 may, as depicted at 332, increase the number of designated wind turbine(s)s 312. In an embodiment, the number of designated wind turbine(s)s 312 may be based on the forecasted duration of the wind speed below the wind speed threshold. It should be appreciated that, in an embodiment, the number of designated wind turbines 312 may be all of the wind turbines 100 of the wind farm 152 so that all of the wind turbines 100 remain operational during a relatively brief drop in the wind speed below the wind speed threshold.

In an embodiment, wherein the wind speed is below the wind speed threshold, the farm controller 164 may, as shown at 314, initiate a transition of the wind farm 152 to a reduced draw mode. In the reduced draw mode, the system 300 may, at 318, operate the designated wind turbine(s) in the full auxiliary mode and, at 320, operate the remaining wind turbines 322 in a reduced auxiliary mode.

In an embodiment, the reduced auxiliary mode may include disabling pitching and/or yawing of the remaining wind turbines 322. The reduced auxiliary mode may, in an embodiment, also include disabling a fan, a pump, and internal light source, a deicing system, a heater, and/or power electronics (e.g., VAR generation) of the remaining wind turbines 322. Further embodiment, the reduced auxiliary mode may include temporarily decoupling the remaining wind turbines 322 from the power grid 166. In the reduced auxiliary modes, the remaining wind turbines 322 may, as depicted in FIG. 4, not seek to maintain aerodynamic alignment with the wind (W). It should be appreciated that since at least a portion of the auxiliary systems of the remaining wind turbines 322 may be disabled, the power draw of the remaining wind turbines 322 from the power grid may also be reduced. In at least one embodiment, reducing the draw from the power grid may result in a cost savings for the wind farm operator.

In an embodiment, the reduced auxiliary mode may include dividing the power consuming components of the wind turbine(s) 100 two categories. A first category may include those power consuming components of the of the wind turbine(s) 100 deemed to be safety critical. The power electronics of the safety critical components may be maintained at a temperature above a safety critical limit. The safety critical limit may be the temperature at which the components block the grid energy from entering a non-started machine, as such an occurrence could lead to a catastrophic failure of the electrical system. A second category may include those power consuming components of the of the wind turbine(s) 100 deemed to be operationally critical. The power electronics of the operationally critical components may be maintained above the safety critical limit and at a temperature that allows the machine to start up safely.

As shown at 324 of FIG. 5, the farm controller 164 of the system 300 may be configured to detect a power output for the designated wind turbine(s) 312 exceeding a power threshold. The power threshold may be established by the farm controller 164 at a level whereat the value of the generated power from the designated wind turbine(s) 322 exceeds the cost associated with the aerodynamically aligning the designated wind turbine(s) 312 to the wind (W) (e.g. the cost of the power drawn from the power grid 166 when driving the auxiliary systems of the designated wind turbine(s) 312).

In an embodiment, the farm controller 164 may, as depicted at 326, direct at least one group, such as a first group 328, of the remaining wind turbines 322 to transition from the reduced auxiliary mode to the full auxiliary mode when the power output for the designated wind turbine(s) 312 exceeds the power threshold. For example, in such embodiments, the farm controller 164 may enable pitching and/or yawing of the wind turbines 100 of the first group 328. It should be appreciated that, in an embodiment, transitioning the first group 328 may include transitioning all of the remaining wind turbines 322 of the wind farm 152 to the full auxiliary mode.

As shown at 334, in an embodiment, prior to directing the first group 328 of the remaining wind turbines 322 to transition from the reduced auxiliary mode, the farm controller 164 may analyze the grid demand signal 302 to determine a power availability level within the power grid 166. In an embodiment, the farm controller may, at 336, detect a shortfall of power availability in the power grid 166. In such an embodiment, the value of any generated power provided to the power grid 166 may be greater than the value of generated power provided to the power grid 166 during periods of surplus power within the power grid 166. Thus, the shortfall of power availability may indicate an opportunity. As shown at 338, the farm controller 164 may accelerate the transition of first group 328 from the reduced auxiliary mode in order to capitalize on the opportunity by supplying power to the power grid 166.

Referring still to 334 of FIG. 6, in an embodiment, the grid demand signal 302 may indicate a sufficient power availability within the power grid 166. In response thereto, the farm controller 164 may, at 340, determine whether the power availability level within the power grid 166 exceeds a threshold. The threshold may be a power availability level above which the utility rate for power drawn from the power grid 166 may be reduced, thereby reducing the cost associated with transitioning the first group 328. In an embodiment wherein the power availability does not exceed the threshold, the farm controller 164 may, at 342, continue operating the remaining wind turbines 322 in the reduced auxiliary mode. In so doing, the farm controller 164 may delay the transition of the first group 328 until the power availability level within the power grid exceeds the threshold.

As shown at 344, in an embodiment, the farm controller 164 may select the wind turbines 100 of the first group 328 of the remaining wind turbines 322. In at least one embodiment, the selection of the first group 328 may be based on the power production profile for each of the plurality of wind turbines 100 for the monitored wind profile 304. For example, the farm controller 164 may select those wind turbines 100 which the respective power production profiles indicate may generate the most power at the given wind speed. The power production profiles of the wind turbines 100 may reflect the positioning of the wind turbines 100 within the wind farm 152. As such, the power production profiles may indicate the wind turbines 100 having the most advantageous positions for the monitored wind profile 304. In an alternative embodiment, the selection may include those wind turbines 100 which the respective power production profiles indicate may be transitioned to the full auxiliary mode at the lowest cost.

Figure 7:
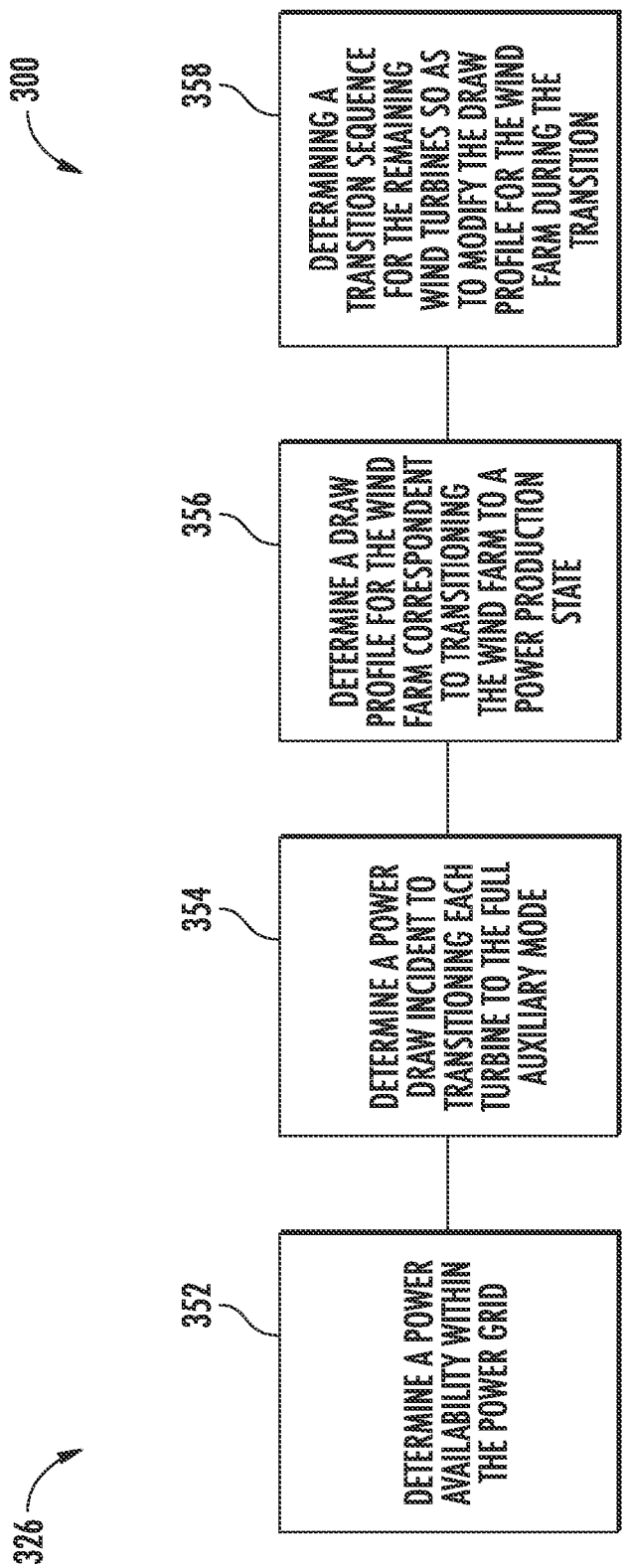
FIG. 7 illustrates a schematic diagram of a portion of the control logic of FIG. 6 particularly illustrating an embodiment of the control logic for controlling a wind farms as to modify a draw profile presented to the power grid during a transition from a reduced auxiliary mode to a full auxiliary mode according to the present disclosure.
Figure 8A:
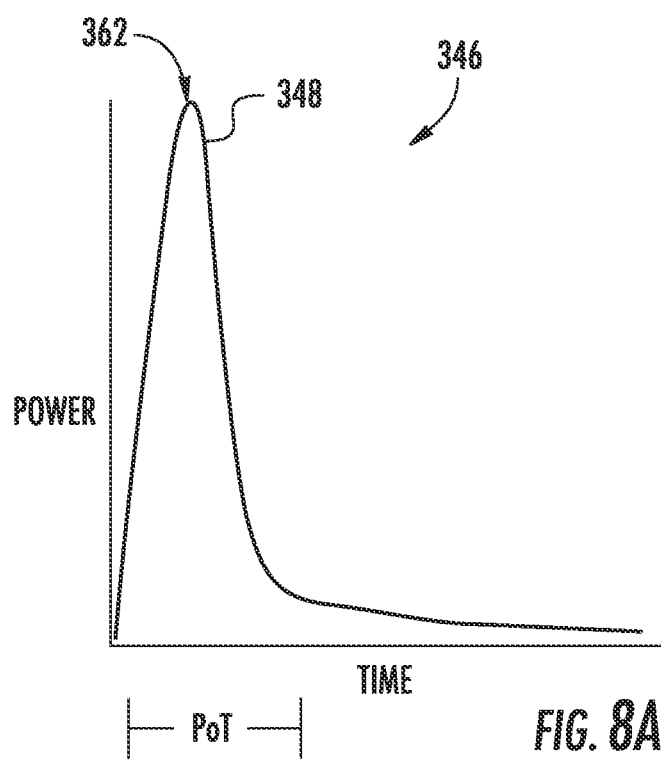
FIGS. 8a and 8b present graphical representations of draw profile presented to a power grid according to the present disclosure.
Figure 8B:
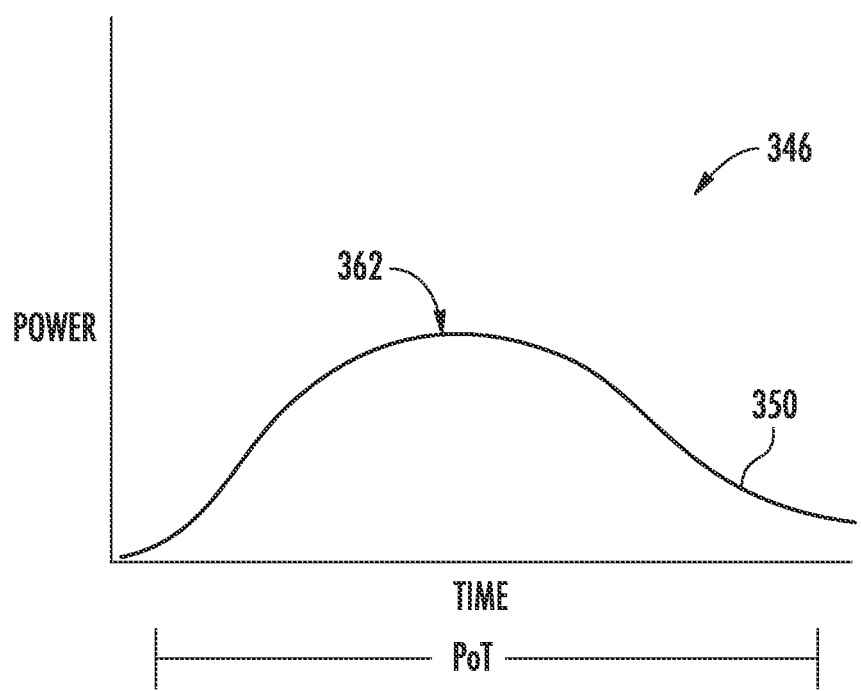

Referring still to FIGS. 5-8b, the farm controller 164 of the system 300 may, in an embodiment, modify a draw profile 346 presented to the power grid 166 by the transition of at least the first group 328 from the reduced auxiliary mode to the full auxiliary mode as depicted at 326. For example, an unmodified draw profile 348 may, as depicted in FIG. 8a, have a relatively significant peak power draw 362 which occurs over a relatively brief duration. Such a draw profile 346 may be indicative of a transition of the entirety of the remaining wind turbines 322 as a single group. Alternatively, a modified draw profile 350 may, as depicted in FIG. 8b, have a reduced peak power draw 362, but may draw the power over a greater period of time. Such a draw profile 346 may be indicative of a sequenced transition and/or delayed transition of the remaining wind turbines 322.

Referring to 326 of FIG. 6, as expanded by FIG. 7, the farm controller 164 may, in an embodiment, receive a grid signal 302 from the power grid 166. As shown at 352, the farm controller 164 may determine a power availability within the power grid 166 based on the grid signal 302. The power availability of the power grid 166 may be indicative of the relative values of power drawn from the power grid 166 and power provided to the power grid 166. As such, synchronizing the draw profile 346 to the power availability may facilitate at least one of reducing the cost of the transition of the remaining wind turbines 322 and maximizing the value of generated power provided to the power grid 166.

As shown at 354 of FIG. 7, the farm controller 164 may, in an embodiment, determine a power draw incident to transitioning each wind turbine 100 of the remaining wind turbines 322 from the reduced auxiliary mode to the full auxiliary mode. Additionally, as shown at 356, the farm controller 164 may determine a power draw profile 346 for the wind farm 152 corresponding to transitioning the wind farm 152 to a power production state. Transitioning the wind farm 152 to the power production state may be based at least in part on the power draw incident to transitioning each wind turbine 100 of the remaining wind turbines 322. Based on the draw profile 346 for the wind farm 152 and the power availability within the power grid 166, the farm controller 164 may, at 358 determine a transition sequence for the remaining wind turbines. The transition sequence may modify the draw profile 346 for the wind farm 152 during the transition. In an embodiment, the farm controller 164 may transition the remaining wind turbines 322 to the full auxiliary mode in accordance with the transition sequence by directing a change in an operating state of the remaining wind turbines 322.

Referring still to 358 of FIG. 7, in an embodiment, the farm controller 164 may partition the remaining wind turbines 322 into a plurality of wind turbine groups 360. In an embodiment, the quantity of groups 360 may be selected to extend a period of transition (PoT) of the wind farm 152 from the reduced auxiliary mode to the full auxiliary mode. The farm controller 164 may sequence the plurality of wind turbine groups 360 in serial arrangement. For example, in at least one embodiment, the remaining wind turbines 322 may be partitioned into three or more groups. In an alternative embodiment, the remaining wind turbines 322 may be partitioned into six or more groups in order to further extend the period of transition (PoT). It should be appreciated that the extension of the period of transition (PoT) by the partitioning of the remaining wind turbines 322 into a plurality of wind turbine groups 360 may serve to synchronize the draw profile 346 of the wind farm 152 with the power availability within the power grid 166.

In an additional embodiment, the farm controller 164 may also define at least one delay interval. The delay interval(s) may be inserted by the farm controller 164 between at least two of the plurality of wind turbine groups 360 in serial arrangement. For example, in an embodiment wherein the remaining wind turbines 322 may be divided into four wind turbine groups 360, the delay interval(s) may be inserted between each of the four wind turbine groups 360. It should be appreciated that the use of the delay interval(s) may further facilitate the synchronization of the draw profile 346 of the wind farm 152 with the power availability within the power grid 166.

Referring still to 358 of FIG. 7, in an embodiment, the farm controller 164 may partition the remaining wind turbines 322 into the plurality of wind turbine groups 360 based on the determined power draw incident to transitioning from the reduced auxiliary mode to the full auxiliary mode for each wind turbine 100. Grouping the wind turbines 100 based on the determined power draw may reduce a peak power draw 362 of the draw profile 346. It should be appreciated that reducing the peak power draw 362 may be desirable in an embodiment wherein the utility rate for power drawn from the power grid 166 may be increased if the power draw exceeds a threshold established by the grid operator for a given interval.

Continuing to refer to 358 of FIG. 7, in an embodiment, the farm controller 164 may derive a power production potential for the wind farm 152 at the monitored wind speed based at least in part on the power output of the designated wind turbine(s) 312. A ratio may be determined by the farm controller 164 which correlates the power production potential of the wind farm to the draw profile 346. Additionally, the farm controller 164 may synchronize the transition sequence of the remaining wind turbines 322 with the power availability within the power grid based on the ratio.

In an additional embodiment, the farm controller 164 may modify the draw profile 346 by delaying the transition of the remaining wind turbines 322 to the full auxiliary mode until a later time of the day. It should be appreciated that this may be especially advantageous when the wind farm 152 is coupled to a power grid 166 which has utility rates tied to the time of day, rather than to a particular draw profile. In such an embodiment, delaying the transition until a later time of day may result in transitioning the remaining wind turbines 322 at a time when the cost incident to the transition may be minimized. It should be further appreciated that the transition of the remaining wind turbines 322 may include partial transitions wherein certain attributes are enabled, while others remained disabled.

In an embodiment, the grid signal 302 may indicate a relatively high level of power availability within the power grid 166. In such an embodiment, modifying the draw profile 346 presented to the power grid 166 may include increasing the power threshold so as to delay the transition of the remaining wind turbines 322. In such an embodiment, the relatively high level of power availability may reduce the value of the power generated and delivered to the power grid 166. As a result, additional power production may be required in order to offset the costs incident to the transition from the reduced auxiliary mode.

In another embodiment, the turbine controller 162 may initiate a safety override to at least partially transition at least one of the remaining wind turbines 322 from the reduced auxiliary mode. For example, in an embodiment wherein the yawing of a wind turbine 100 is disabled in the reduced auxiliary mode, a change in the direction of wind (W) may result in crosswinds acting on the wind turbine 100 which exceed a load limit of the wind turbine 100. As such, it may be desirable to enable the yawing of the wind turbine 100 in order to aerodynamically align the wind turbine 100 with the wind (W).

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a wind farm during low wind speeds, the wind farm having a plurality of wind turbines operably coupled to a farm controller and a power grid, the method comprising: monitoring a wind profile of a wind affecting the wind farm, wherein the profile comprises wind speed and wind direction; designating, with the farm controller, at least one of the plurality of wind turbines as a designated wind turbine; operating the designated wind turbine in a full auxiliary mode when the wind speed of the wind farm is below a wind speed threshold, wherein the full auxiliary mode comprises, at least, enabling pitching and yawing of the designated wind turbine; operating remaining wind turbines of the plurality of wind turbines in a reduced auxiliary mode when the wind speed of the wind farm is below the wind speed threshold, wherein the reduced auxiliary mode comprises disabling at least one of pitching and yawing of the remaining wind turbines; and when a power output for the designated wind turbine exceeds a power threshold, directing, with the farm controller, at least one group of the remaining wind turbines to transition from the reduced auxiliary mode to the full auxiliary mode.

Clause 2. The method of any preceding clause, further comprising: prior to directing the at least one group of the remaining wind turbines to transition from the reduced auxiliary mode, analyzing, with the farm controller, a grid demand signal received from the power grid so as to determine a power availability level within the power grid.

Clause 3. The method of any preceding clause, wherein transitioning the at least one group from the reduced auxiliary mode further comprises delaying the transition until the power availability level within the power grid exceeds a threshold.

Clause 4. The method of any preceding clause, further comprising: accelerating the transition of the at least one group from the reduced auxiliary mode in order to supply power to the power grid in response to a detected shortfall of power availability in the power grid.

Clause 5. The method of any preceding clause, further comprising: analyzing, with the farm controller, a grid demand signal received from the power grid so as to determine a power availability level within the power grid; based on the determined power availability level, lowering, with the farm controller, the wind speed threshold so as to delay a transition of the remaining wind turbines of the plurality of wind turbines to a reduced auxiliary mode, wherein delaying the transition to the reduced auxiliary mode facilitates wind farm power production at reduced wind speeds in order to satisfy the demand signal from the power grid.

Clause 6. The method of any preceding clause, wherein designating at least one of the plurality of wind turbines as the designated wind turbine further comprises: selecting, with the farm controller, at least one of the plurality of wind turbines based on a power production profile for each of the plurality of wind turbines for the monitored wind profile.

Clause 7. The method of any preceding clause, further comprising: forecasting, with the farm controller, a performance profile for the designated wind turbine for the wind affecting the wind farm, wherein the forecast is based on the power production profile; correlating, with the farm controller, the forecast performance profile to a recorded performance profile of the designated wind turbine; and refining, with the farm controller, the power production profile for the designated wind turbine based on the correlation.

Clause 8. The method of any preceding clause, wherein the wind profile further comprises a pressure gradient, determining the designated wind turbine further comprises: based on a pressure gradient, forecasting, with the farm controller, a wind speed below the wind speed threshold for a limited duration; and increasing the number of designated wind turbines based on the forecasted duration of the wind speed below the wind speed threshold.

Clause 9. The method of any preceding clause, wherein transitioning the at least one group of the remaining wind turbines to the full auxiliary mode further comprises: selecting, with the farm controller, the wind turbines of the at least one group of the remaining wind turbines based on a power production profile for each of the plurality of wind turbines for the monitored wind profile.

Clause 10. The method of claim 1, further comprising: initiating a safety override to at least partially transition at least one of the remaining wind turbines from the reduced auxiliary mode.

Clause 11. The method of any preceding clause, wherein operating the remaining turbines in a reduced auxiliary mode comprises temporarily decoupling the remaining turbines from the power grid.

Clause 12. The method of any preceding clause, wherein the reduced auxiliary mode further comprises disabling at least one of a fan, a pump, an internal light source, and a deicing system.

Clause 13. A method for controlling a wind farm so as to modify a draw profile presented to a power grid, the wind farm having a plurality of wind turbines operably coupled to a farm controller and a power grid, the method comprising: operating a designated wind turbine of the plurality of wind turbines in a full auxiliary mode; operating remaining wind turbines of the plurality of wind turbines in a reduced auxiliary mode until a power output for the designated wind turbine exceeds a power threshold, wherein the reduced auxiliary mode comprises disabling at least one of pitching and yawing of the remaining wind turbines; receiving, with the farm controller, a grid signal from the power grid indicative of a power availability within the power grid at a monitored wind speed; determining, with the farm controller, a power draw incident to transitioning each wind turbine of the remaining wind turbines from the reduced auxiliary mode to the full auxiliary mode; determining, with the farm controller, a draw profile for the wind farm corresponding to transitioning the wind farm to a power production state, wherein transitioning the wind farm to the power production state is based at least in part on the power draw incident to transitioning each wind turbine of the remaining wind turbines; determining, with the farm controller, a transition sequence for the remaining wind turbines so as to modify the draw profile for the wind farm during the transition; and transitioning the remaining wind turbines to the full auxiliary mode in accordance with the transition sequence.

Clause 14. The method of any preceding clause, wherein determining the transition sequence for the remaining wind turbines comprises: partitioning, with the farm controller, the remaining wind turbines into a plurality of wind turbine groups, wherein the quantity of groups is selected to extend a period of transition of the wind farm from the reduced auxiliary mode to the full auxiliary mode; and sequencing, with the farm controller, the plurality of wind turbine groups in serial arrangement.

Clause 15. The method of any preceding clause, further comprising: defining, with the farm controller, at least one delay interval; and inserting, with the farm controller, the at least one delay interval between at least two of the plurality of wind turbine groups in serial arrangement.

Clause 16. The method of any preceding clause, wherein determining the transition sequence for the remaining wind turbines comprises: partitioning, with the farm controller, the remaining turbines into a plurality of wind turbine groups based on the determined power draw incident to transitioning from the reduced auxiliary mode to the full auxiliary mode for each wind turbine, wherein grouping the wind turbines based on the determined power draw reduces a peak power draw of the draw profile.

Clause 17. The method of any preceding clause, wherein determining the transition sequence for the remaining wind turbines comprises: deriving, with the farm controller, a power production potential for the wind farm at the monitored wind speed based at least in part on the power output of the at least one designated wind turbine; determining, with the farm controller, a ratio of the power production potential to the draw profile; and synchronizing, with the farm controller, the transition sequence of the remaining wind turbines with the power availability within the power grid based on the ratio.

Clause 18. The method of any preceding clause, further comprising: after the power output of the designated wind turbine exceeds the power threshold, delaying the transition of the remaining wind turbines to the full auxiliary mode until a later time of a day.

Clause 19. The method of any preceding clause, wherein the grid signal indicates a high level of power availability within the power grid, the method further comprising: increasing the power threshold so as to delay the transition of the remaining wind turbines.

Clause 20. The method of any preceding clause, wherein determining the transition sequence for the remaining wind turbines comprises: monitoring a wind profile of a wind affecting the wind farm, wherein the profile comprises the wind speed and a wind direction; and selecting, with the farm controller, at least one group of the remaining wind turbines based on a power production profile for each of the remaining wind turbines for the monitored wind profile.

What is claimed is:

1. A method for controlling a wind farm during low wind speeds, the wind farm having a plurality of wind turbines operably coupled to a farm controller and a power grid, the method comprising:
   monitoring a wind profile of a wind affecting the wind farm, wherein the profile comprises wind speed and wind direction;
   designating, with the farm controller, at least one of the plurality of wind turbines as a designated wind turbine, wherein designating at least one of the plurality of wind turbines as the designated wind turbine further comprises selecting, with the farm controller, at least one of the plurality of wind turbines based on a power production profile for each of the plurality of wind turbines for the wind profile;
   forecasting, with the farm controller, a performance profile for the designated wind turbine for wind affecting the wind farm based on the power production profile;
   correlating, with the farm controller, the power production profile to a recorded power production profile of the designated wind turbine;
   refining, with the farm controller, the power production profile for the designated wind turbine based on the correlation;
   operating the designated wind turbine in a full auxiliary mode when the wind speed of the wind farm is below a wind speed threshold, wherein the full auxiliary mode comprises, at least, enabling pitching and yawing of the designated wind turbine;
   operating remaining wind turbines of the plurality of wind turbines in a reduced auxiliary mode when the wind speed of the wind farm is below the wind speed threshold, wherein the reduced auxiliary mode comprises disabling at least one of pitching and yawing of the remaining wind turbines; and
   when a power output for the designated wind turbine exceeds a power threshold, directing, with the farm controller, at least one group of the remaining wind turbines to transition from the reduced auxiliary mode to the full auxiliary mode.

2. The method of claim 1, further comprising:
   prior to directing the at least one group of the remaining wind turbines to transition from the reduced auxiliary mode, analyzing, with the farm controller, a grid demand signal received from the power grid so as to determine a power availability level within the power grid.

3. The method of claim 2, wherein transitioning the at least one group from the reduced auxiliary mode further comprises delaying the transition until the power availability level within the power grid exceeds a threshold.

4. The method of claim 2, further comprising:
   accelerating the transition of the at least one group from the reduced auxiliary mode in order to supply power to the power grid in response to a detected shortfall of power availability in the power grid.

5. The method of claim 1, further comprising:
   analyzing, with the farm controller, a grid demand signal received from the power grid so as to determine a power availability level within the power grid;
   based on the determined power availability level, lowering, with the farm controller, the wind speed threshold so as to delay a transition of the remaining wind turbines of the plurality of wind turbines to the reduced auxiliary mode, wherein delaying the transition to the reduced auxiliary mode facilitates wind farm power production at reduced wind speeds in order to satisfy the demand signal from the power grid.

6. The method of claim 1, wherein the wind profile further comprises a pressure gradient, determining the designated wind turbine further comprises:
   based on the pressure gradient, forecasting, with the farm controller, a wind speed below the wind speed threshold for a limited duration; and
   increasing the number of designated wind turbines based on the forecasted duration of the wind speed below the wind speed threshold.

7. The method of claim 1, wherein transitioning the at least one group of the remaining wind turbines to the full auxiliary mode further comprises:
   selecting, with the farm controller, the wind turbines of the at least one group of the remaining wind turbines based on a power production profile for each of the plurality of wind turbines for the monitored wind profile.

8. The method of claim 1, further comprising:
   initiating a safety override to at least partially transition at least one of the remaining wind turbines from the reduced auxiliary mode.

9. The method of claim 1, wherein operating the remaining turbines in a reduced auxiliary mode comprises temporarily decoupling the remaining turbines from the power grid.

10. The method of claim 1, wherein the reduced auxiliary mode further comprises disabling at least one of a fan, a pump, an internal light source, a deicing system, a heater, and power electronics.

11. A method for controlling a wind farm so as to modify a wind profile presented to a power grid, the wind farm having a plurality of wind turbines operably coupled to a farm controller and a power grid, the method comprising:
   designating, with the farm controller, at least one of the plurality of wind turbines as a designated wind turbine, wherein designating at least one of the plurality of wind turbines as the designated wind turbine further comprises selecting, with the farm controller, at least one of the plurality of wind turbines based on a power production profile for each of the plurality of wind turbines for the wind profile;

forecasting, with the farm controller, a performance profile for the designated wind turbine for wind affecting the wind farm based on the power production profile;

correlating, with the farm controller, the power production profile to a recorded power production profile of the designated wind turbine;

refining, with the farm controller, the power production profile for the designated wind turbine based on the correlation;

operating the designated wind turbine of the plurality of wind turbines in a full auxiliary mode;

operating remaining wind turbines of the plurality of wind turbines in a reduced auxiliary mode until a power output for the designated wind turbine exceeds a power threshold, wherein the reduced auxiliary mode comprises disabling at least one of pitching and yawing of the remaining wind turbines;

receiving, with the farm controller, a grid signal from the power grid indicative of a power availability within the power grid at a monitored wind speed;

determining, with the farm controller, a power draw incident to transitioning each wind turbine of the remaining wind turbines from the reduced auxiliary mode to the full auxiliary mode;

determining, with the farm controller, a draw profile for the wind farm corresponding to transitioning the wind farm to a power production state, wherein transitioning the wind farm to the power production state is based at least in part on the power draw incident to transitioning each wind turbine of the remaining wind turbines;

determining, with the farm controller, a transition sequence for the remaining wind turbines so as to modify the draw profile for the wind farm during the transition; and transitioning the remaining wind turbines to the full auxiliary mode in accordance with the transition sequence.

12. The method of claim 11, wherein determining the transition sequence for the remaining wind turbines comprises:

partitioning, with the farm controller, the remaining wind turbines into a plurality of wind turbine groups, wherein the quantity of groups is selected to extend a period of transition of the wind farm from the reduced auxiliary mode to the full auxiliary mode; and sequencing, with the farm controller, the plurality of wind turbine groups in serial arrangement.

13. The method of claim 12, further comprising:

defining, with the farm controller, at least one delay interval; and inserting, with the farm controller, the at least one delay interval between at least two of the plurality of wind turbine groups in serial arrangement.

14. The method of claim 11, wherein determining the transition sequence for the remaining wind turbines comprises:

partitioning, with the farm controller, the remaining turbines into a plurality of wind turbine groups based on the determined power draw incident to transitioning from the reduced auxiliary mode to the full auxiliary mode for each wind turbine, wherein grouping the wind turbines based on the determined power draw reduces a peak power draw of the draw profile.

15. The method of claim 11, wherein determining the transition sequence for the remaining wind turbines comprises:

deriving, with the farm controller, a power production potential for the wind farm at the monitored wind speed based at least in part on the power output of the at least one designated wind turbine;

determining, with the farm controller, a ratio of the power production potential to the draw profile; and synchronizing, with the farm controller, the transition sequence of the remaining wind turbines with the power availability within the power grid based on the ratio.

16. The method of claim 11, further comprising:

after the power output of the designated wind turbine exceeds the power threshold, delaying the transition of the remaining wind turbines to the full auxiliary mode until a later time of a day.

17. The method of claim 11, wherein the grid signal indicates a high level of power availability within the power grid, the method further comprising:

increasing the power threshold so as to delay the transition of the remaining wind turbines.

18. The method of claim 11, wherein determining the transition sequence for the remaining wind turbines comprises:

wherein the profile comprises the wind speed and a wind direction; and selecting, with the farm controller, at least one group of the remaining wind turbines based on a power production profile for each of the remaining wind turbines for the monitored wind profile.

* * * * *